(12) United States Patent
Wiegman

(10) Patent No.: US 11,639,230 B1
(45) Date of Patent: May 2, 2023

(54) SYSTEM FOR AN INTEGRAL HYBRID ELECTRIC AIRCRAFT

(71) Applicant: BETA AIR, LLC, South Burlington, VT (US)

(72) Inventor: Herman Wiegman, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/734,015

(22) Filed: Apr. 30, 2022

(51) Int. Cl.
| | |
|---|---|
| *B64D 27/24* | (2006.01) |
| *B64D 37/04* | (2006.01) |
| *B64C 29/00* | (2006.01) |
| *B60L 50/60* | (2019.01) |
| *H01M 50/204* | (2021.01) |
| *H01M 50/51* | (2021.01) |
| *H01M 50/249* | (2021.01) |

(Continued)

(52) U.S. Cl.
CPC ............. *B64D 27/24* (2013.01); *B60L 50/66* (2019.02); *B64C 29/0008* (2013.01); *B64D 37/04* (2013.01); *H01M 50/204* (2021.01); *H01M 50/249* (2021.01); *H01M 50/51* (2021.01); *B60L 2200/10* (2013.01); *B64C 1/20* (2013.01); *B64D 2027/026* (2013.01); *H01M 2220/20* (2013.01)

(58) Field of Classification Search
CPC .. B64D 27/24; B64D 37/04; B64D 2027/026; B64C 29/0008; B64C 1/20; B60L 50/66; B60L 2200/10; H01M 50/204; H01M 50/249; H01M 50/51; H01M 2220/20
See application file for complete search history.

(56) References Cited

U.S. PATENT DOCUMENTS

| | | | | |
|---|---|---|---|---|
| 3,155,071 A | * | 11/1964 | Buttner ................. | B63H 11/08 440/43 |
| 3,605,935 A | * | 9/1971 | Gilbert ..................... | B60F 1/00 296/35.3 |

(Continued)

FOREIGN PATENT DOCUMENTS

WO 2019211875 11/2019

OTHER PUBLICATIONS

Amro A. Alshareef, The Design and Fabrication of an Autonomous Hybrid VTOL Aircraft, May 31, 2020.

(Continued)

*Primary Examiner* — Medhat Badawi
(74) *Attorney, Agent, or Firm* — Caldwell Intellectual Property Law

(57) ABSTRACT

An integral hybrid electric aircraft system including a fuselage including an electrical energy source, wherein the electrical energy source includes a plurality of batteries and a fuel tank, and wherein the fuel tank contains fuel. The fuselage also including a generator in fluid communication with the fuel tank. The generator generates electricity using the fuel from the fuel tank. The system including a set of propulsors, wherein each propulsor of the set of propulsors is electrically connected to the electrical energy source and the generator and wherein the set of propulsors is configured to be powered by the generator during fixed-wing flight. The set of propulsors including at least a pusher propulsor configured to provide forward thrust and at least a lift propulsor configured to provide lift.

18 Claims, 8 Drawing Sheets

(51) Int. Cl.
*B64D 27/02* (2006.01)
*B64C 1/20* (2006.01)

(56) References Cited

U.S. PATENT DOCUMENTS

| | | | | |
|---|---|---|---|---|
| 5,613,653 | A * | 3/1997 | Bombled | B64G 1/641 244/173.1 |
| 5,890,441 | A * | 4/1999 | Swinson | B64C 29/0025 244/12.3 |
| 6,138,951 | A * | 10/2000 | Budris | B64G 1/645 102/393 |
| 7,857,254 | B2 * | 12/2010 | Parks | B64C 15/00 244/12.4 |
| 7,950,606 | B2 * | 5/2011 | Atkey | B64D 13/06 244/135 R |
| 8,469,306 | B2 * | 6/2013 | Kuhn, Jr. | B64C 29/0033 244/12.4 |
| 8,552,575 | B2 * | 10/2013 | Teets | G01S 5/0018 290/40 C |
| 9,139,310 | B1 * | 9/2015 | Wang | B60L 53/14 |
| 9,193,451 | B2 * | 11/2015 | Salyer | B64C 37/00 |
| 9,284,058 | B2 * | 3/2016 | Wang | B64D 27/24 |
| 9,376,208 | B1 * | 6/2016 | Gentry | G05D 1/042 |
| 9,434,267 | B2 * | 9/2016 | Wang | B64F 1/007 |
| 9,475,579 | B2 * | 10/2016 | Fredericks | B64D 27/26 |
| 9,493,235 | B2 * | 11/2016 | Zhou | B60F 5/02 |
| 9,567,088 | B2 * | 2/2017 | Godlasky | B64C 29/02 |
| 9,592,744 | B2 * | 3/2017 | Zhao | B60L 58/12 |
| 9,751,614 | B1 * | 9/2017 | Nguyen | B64C 15/02 |
| 9,932,118 | B2 * | 4/2018 | Bak | B64C 29/0025 |
| 10,017,270 | B2 * | 7/2018 | Becker | F02C 7/32 |
| 10,137,983 | B2 * | 11/2018 | Horn | B64D 47/08 |
| 10,189,565 | B2 * | 1/2019 | Patterson | B64C 29/0033 |
| 10,252,810 | B2 * | 4/2019 | Niergarth | F01D 25/24 |
| 10,287,011 | B2 * | 5/2019 | Wolff | B64C 27/22 |
| 10,287,013 | B2 * | 5/2019 | Starace | B64C 9/00 |
| 10,351,235 | B2 * | 7/2019 | Karem | B64C 13/18 |
| 10,453,348 | B2 * | 10/2019 | Speasl | G08G 5/0034 |
| 10,479,223 | B2 * | 11/2019 | Demont | B64F 5/60 |
| 10,501,195 | B2 * | 12/2019 | Wang | H02M 3/156 |
| 10,562,623 | B1 * | 2/2020 | Sloan | B64C 13/18 |
| 10,597,152 | B2 * | 3/2020 | Groninga | B64C 39/008 |
| 10,604,266 | B2 * | 3/2020 | Roever | B64D 27/16 |
| 10,630,082 | B1 * | 4/2020 | Gu | B64F 1/362 |
| 10,661,896 | B2 * | 5/2020 | Ozaki | B64C 39/02 |
| 10,676,205 | B2 * | 6/2020 | Niergarth | B64D 27/24 |
| 10,762,726 | B2 * | 9/2020 | Gansler | B64D 35/08 |
| 10,793,281 | B2 * | 10/2020 | Vondrell | B64D 27/24 |
| 10,906,656 | B2 * | 2/2021 | Gilliland | B64C 27/28 |
| 10,926,874 | B2 * | 2/2021 | Giannini | B64C 3/385 |
| 10,981,650 | B2 * | 4/2021 | Fink | B64C 39/068 |
| 11,149,578 | B2 * | 10/2021 | Joshi | F02C 6/14 |
| 11,312,486 | B2 * | 4/2022 | Regev | B64D 35/02 |
| 11,365,001 | B1 * | 6/2022 | Woodall | B64C 29/0033 |
| 11,407,529 | B1 * | 8/2022 | Barnes | B64C 15/02 |
| 11,435,762 | B1 * | 9/2022 | Auerbach | B64C 13/506 |
| 11,437,662 | B1 * | 9/2022 | Wiegman | H01M 10/486 |
| 11,440,427 | B1 * | 9/2022 | Wiegman | B60L 53/16 |
| 11,440,678 | B1 * | 9/2022 | Wiegman | B64D 45/04 |
| 11,443,569 | B1 * | 9/2022 | Churchill | B64C 13/503 |
| 11,444,464 | B1 * | 9/2022 | Ford | G05B 15/02 |
| 11,447,015 | B1 * | 9/2022 | Wiegman | B64D 27/24 |
| 11,447,030 | B1 * | 9/2022 | Palombini | B60L 53/65 |
| 11,447,035 | B1 * | 9/2022 | Hull | B60L 53/53 |
| 11,447,244 | B1 * | 9/2022 | Griffin | B64C 29/0033 |
| 11,449,078 | B1 * | 9/2022 | Freiheit | B64D 27/24 |
| 11,453,488 | B2 * | 9/2022 | Klemen | B64D 27/10 |
| 11,453,489 | B2 * | 9/2022 | Tian | B64C 29/0025 |
| 11,453,490 | B2 * | 9/2022 | Bevirt | B64D 27/24 |
| 11,453,508 | B2 * | 9/2022 | Dubreuil | F16H 57/0475 |
| 11,454,990 | B1 * | 9/2022 | List | B64C 29/00 |
| 11,456,472 | B2 * | 9/2022 | Tichy | H01M 8/04164 |
| 11,456,511 | B2 * | 9/2022 | Demont | B60L 50/64 |
| 11,456,693 | B2 * | 9/2022 | Berry | H02K 11/33 |
| 11,465,529 | B1 * | 10/2022 | Palombini | B64C 29/00 |
| 2003/0085319 | A1 * | 5/2003 | Wagner | B64C 27/20 244/12.3 |
| 2008/0136257 | A1 * | 6/2008 | Flanigan | H02P 9/307 307/10.1 |
| 2011/0168416 | A1 * | 7/2011 | Frasure | H01B 7/0045 169/61 |
| 2012/0128493 | A1 * | 5/2012 | Shelley | F02C 7/32 416/146 R |
| 2016/0229532 | A1 * | 8/2016 | Shapery | B64C 29/0075 |
| 2017/0327219 | A1 * | 11/2017 | Alber | B64C 29/02 |
| 2018/0065739 | A1 * | 3/2018 | Vondrell | B64D 27/24 |
| 2018/0215462 | A1 * | 8/2018 | Fenny | B64C 11/28 |
| 2018/0229606 | A1 * | 8/2018 | Vondrell | B60L 50/10 |
| 2018/0251226 | A1 * | 9/2018 | Fenny | B64D 27/24 |
| 2018/0290771 | A1 * | 10/2018 | Chiang | B64G 1/645 |
| 2018/0291807 | A1 * | 10/2018 | Dalal | F02K 5/00 |
| 2018/0304753 | A1 * | 10/2018 | Vondrell | B64C 21/06 |
| 2018/0354632 | A1 * | 12/2018 | Hon | B64D 27/10 |
| 2018/0372003 | A1 * | 12/2018 | Hon | F01D 25/36 |
| 2019/0235502 | A1 * | 8/2019 | Lindsey | B64C 39/024 |
| 2019/0241274 | A1 * | 8/2019 | Hunkel | H02J 7/345 |
| 2019/0339334 | A1 * | 11/2019 | Mikolajczak | B64D 27/24 |
| 2019/0375495 | A1 * | 12/2019 | Pfammatter | B64C 27/28 |
| 2020/0272141 | A1 * | 8/2020 | Chung | B64C 39/024 |
| 2020/0277066 | A1 * | 9/2020 | Becker | B64D 31/12 |
| 2020/0290742 | A1 * | 9/2020 | Kumar | B64D 27/24 |
| 2020/0298036 | A1 * | 9/2020 | Partridge | B64D 45/00 |
| 2020/0407060 | A1 * | 12/2020 | Hosseini | G05D 1/101 |
| 2021/0070179 | A1 * | 3/2021 | Wiegman | B60L 3/12 |
| 2021/0078714 | A1 * | 3/2021 | Demont | H01M 10/486 |
| 2021/0098143 | A1 * | 4/2021 | Trojer | G21C 5/10 |
| 2021/0214094 | A1 * | 7/2021 | Harwood | B64D 27/24 |
| 2021/0284329 | A1 * | 9/2021 | Bernard | B64C 25/52 |
| 2021/0339853 | A1 * | 11/2021 | Blinkov | B64C 29/0025 |
| 2022/0055762 | A1 * | 2/2022 | Clarke | H01M 8/04029 |
| 2022/0056843 | A1 * | 2/2022 | Burkett | F02K 1/04 |
| 2022/0094297 | A1 * | 3/2022 | Lacaux | B64C 11/303 |
| 2022/0135240 | A1 * | 5/2022 | Imel | B64D 31/06 60/716 |
| 2022/0169366 | A1 * | 6/2022 | Truong | B64C 29/0025 |
| 2022/0177109 | A1 * | 6/2022 | Hefner | B64C 1/068 |
| 2022/0213842 | A1 * | 7/2022 | Mercier-Calvairac | F02K 5/00 |
| 2022/0250762 | A1 * | 8/2022 | Sperrin | F17C 11/005 |
| 2022/0255316 | A1 * | 8/2022 | Perkinson | B64D 31/14 |
| 2022/0258645 | A1 * | 8/2022 | Bower | B60L 3/0046 |
| 2022/0281593 | A1 * | 9/2022 | Stobbe | B64C 3/32 |
| 2022/0281597 | A1 * | 9/2022 | Tian | B64C 39/024 |
| 2022/0285753 | A1 * | 9/2022 | Rainville | H01M 10/6555 |
| 2022/0286019 | A1 * | 9/2022 | Vive | H02K 21/28 |
| 2022/0289376 | A1 * | 9/2022 | Hayakawa | G05D 1/101 |
| 2022/0289379 | A1 * | 9/2022 | Morrison | B64D 27/24 |
| 2022/0289400 | A1 * | 9/2022 | Kim | G05D 1/0858 |
| 2022/0290576 | A1 * | 9/2022 | Ota | B64D 27/24 |
| 2022/0291683 | A1 * | 9/2022 | Bacic | G08G 5/0091 |
| 2022/0292987 | A1 * | 9/2022 | Bacic | B64D 27/24 |
| 2022/0292991 | A1 * | 9/2022 | Bacic | B60L 58/12 |
| 2022/0297822 | A1 * | 9/2022 | Ol | B64C 11/46 |
| 2022/0297827 | A1 * | 9/2022 | Colaciti | B64C 11/18 |
| 2022/0297844 | A1 * | 9/2022 | Mackin | B64D 27/24 |
| 2022/0297846 | A1 * | 9/2022 | Mark | B64D 35/08 |
| 2022/0297848 | A1 * | 9/2022 | Sivalingam | H02M 7/003 |
| 2022/0298925 | A1 * | 9/2022 | Tamada | F01D 17/145 |
| 2022/0298968 | A1 * | 9/2022 | Forsdike | H05K 7/20927 |
| 2022/0299569 | A1 * | 9/2022 | Kurtz | B64D 43/00 |
| 2022/0302477 | A1 * | 9/2022 | Lan | B64D 37/30 |
| 2022/0302801 | A1 * | 9/2022 | Osama | H02K 11/21 |
| 2022/0302843 | A1 * | 9/2022 | Marxgut | H02M 7/4837 |

OTHER PUBLICATIONS

Loz Blain, Pegasus hybrid-electric VTOL promises massive range, no redundancy, Aug. 10, 2021.

American Machinist Staff, GE Aviation Supplying Hybrid Propulsion System for VTOL, Jul. 25, 2019.

* cited by examiner

SYSTEM FOR AN INTEGRAL HYBRID ELECTRIC AIRCRAFT

FIELD OF THE INVENTION

The present invention generally relates to the field of hybrid aircraft. In particular, the present invention is directed to a system for an integral hybrid electric aircraft.

BACKGROUND

Electric aircraft hold great promise as the future of commercial and recreational flight. Electric aircraft may be able to lessen our dependence on fossil fuel and help decrease greenhouse gas emissions. However, the batteries on which electric aircraft rely have a lower energy density than conventional fuel. This leads to range limitations. Existing solutions to this problem are not sufficient.

SUMMARY OF THE DISCLOSURE

In an aspect, an integral hybrid electric aircraft system, the system including a fuselage, the fuselage including an electrical energy source, wherein the electrical energy source includes a plurality of batteries, and a fuel tank, wherein the fuel tank contains fuel. The fuselage also including a generator, wherein the generator is in fluid communication with the fuel tank and the generator generates electricity using the fuel from the fuel tank. The system further including a set of propulsors, wherein each propulsor of the set of propulsors is electrically connected to the electrical energy source and the generator. The set of propulsors is configured to be powered by the generator during fixed-wing flight. The set of propulsors including at least a pusher propulsor, wherein the at least a pusher propulsor is configured to provide forward thrust and at least a lift propulsor, wherein the at least a lift propulsor is configured to provide lift.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for an integral hybrid electric aircraft. Aspects of the present disclosure include a generator, wherein the generator may generate electrical energy. The generator may run off of fuel in fuel tanks.

Aspects of the present disclosure include an electrical energy source. The electrical energy source includes a plurality of batteries. In some aspects of the present disclosure, the plurality of batteries may be assembled into battery modules, wherein each battery module consists of batteries connected in series. By connecting the batteries in series, the voltage of the battery module may be higher than the voltage of the individual batteries.

Aspects of the present disclosure allow for the propulsors of the aircraft to receive power from both the generator and the electrical energy source. In some aspects, the generator may be selected such that the generator can support the fixed-wing flight of the aircraft. However, in order to support vertical take-off and landing of the aircraft, power from the electrical energy source is needed to supplement the power from the generator.

Figure 1:
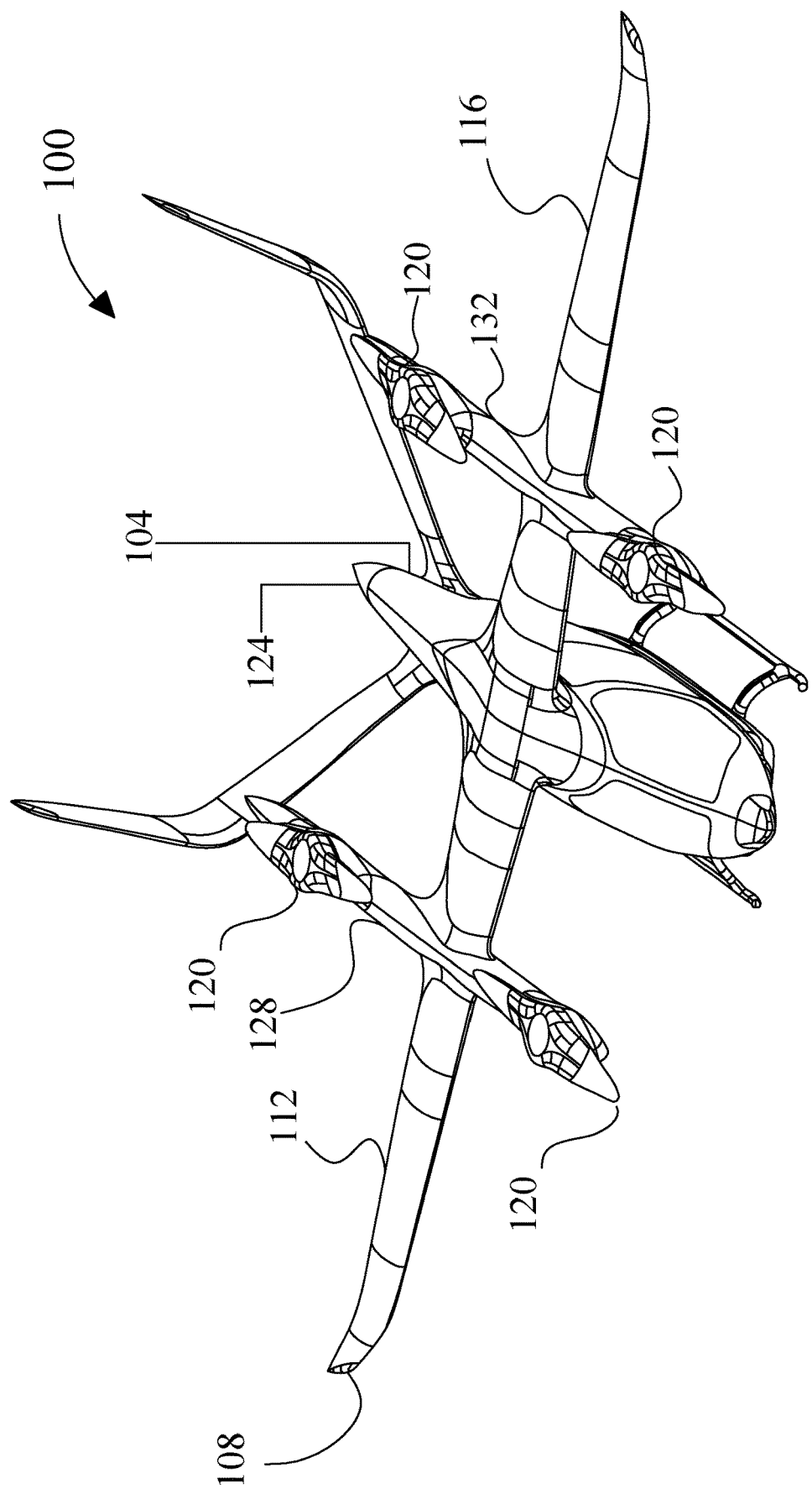
FIG. 1 is an illustration of an exemplary embodiment of an electric aircraft.

Referring now to FIG. 1, an exemplary embodiment of an electric aircraft 100 is illustrated. Electric aircraft 100 may include an electrically powered aircraft. In some embodiments, electrically powered aircraft may be an electric vertical takeoff and landing (eVTOL) aircraft. Electric aircraft 100 may be capable of rotor-based cruising flight, rotor-based takeoff, rotor-based landing, fixed-wing cruising flight, conventional takeoff, conventional landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft flies using wings and/or foils to generate lift caused by the aircraft's forward airspeed and the shape of the wings and/or foils.

In an embodiment, and still referring to FIG. 1, electric aircraft 100 may include a fuselage 104. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 104 may comprise structural elements that physically support the shape and structure of an aircraft. Structural elements may take a plurality of forms, alone or in combination with other types. Structural elements may vary depending on the construction type of aircraft and specifically, the fuselage. Fuselage 104 may comprise a truss structure. A truss structure is often used with a lightweight aircraft and includes welded steel tube trusses. A truss, as used herein, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later in this paper.

In embodiments, fuselage 104 may comprise geodesic construction. Geodesic structural elements may include stringers wound about formers (which may be alternatively called station frames) in opposing spiral directions. A stringer, as used herein, is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along the length of the interior of fuselage 104 orthogonal to the longitudinal (nose to tail) axis of the aircraft and forms the general shape of fuselage 104. A former may comprise differing cross-sectional shapes at differing locations along fuselage 104, as the former is the structural element that informs the overall shape of a fuselage 104 curvature. In embodiments, aircraft skin can be anchored to formers and strings such that the outer mold line of the volume encapsulated by the formers and stringers includes the same shape as electric aircraft when installed. In other words, former(s) may form a fuselage's ribs, and the stringers may form the interstitials between such ribs. The spiral orientation of stringers about formers provides uniform robustness at any point on an aircraft fuselage such that if a portion sustains damage, another portion may remain largely unaffected. Aircraft skin would be mechanically coupled to underlying stringers and formers and may interact with a fluid, such as air, to generate lift and perform maneuvers.

In an embodiment, and still referring to FIG. 1, fuselage 104 may comprise monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

Still referring to FIG. 1, fuselage 104 may include a semi-monocoque construction. Semi-monocoque construction, as used herein, is a partial monocoque construction, wherein a monocoque construction is describe above detail. In semi-monocoque construction, fuselage 104 may derive some structural support from stressed aircraft skin and some structural support from underlying frame structure made of structural elements. Formers or station frames can be seen running transverse to the long axis of fuselage 104 with circular cutouts which are generally used in real-world manufacturing for weight savings and for the routing of electrical harnesses and other modern on-board systems. In a semi-monocoque construction, stringers are the thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate that there are numerous methods for mechanical fastening of the aforementioned components like crews, nails, dowels, pins, anchors, adhesives like glue or epoxy, or bolts and nuts, to name a few. A subset of fuselage under the umbrella of semi-monocoque construction is unibody vehicles. Unibody, which is short for "unitized body" or alternatively "unitary construction", vehicles are characterized by a construction in which the body, floor plan, and chassis form a single structure. In the aircraft world, unibody would comprise the internal structural elements like formers and stringers are constructed in one piece, integral to the aircraft skin as well as any floor construction like a deck.

Still referring to FIG. 1, it should be noted that an illustrative embodiment is presented only, and this disclosure in no way limits the form or construction of electric aircraft. In embodiments, fuselage 104 may be configurable based on the needs of the electric per specific mission or objective. The general arrangement of components, structural elements, and hardware associated with storing and/or moving a payload may be added or removed from fuselage 104 as needed, whether it is stowed manually, automatedly, or removed by personnel altogether. Fuselage 104 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 104 may also be configurable to accept certain specific cargo containers, or a receptable that can, in turn, accept certain cargo containers.

Still referring to FIG. 1, fuselage 104 includes an electrical energy source. An "electrical energy source," for the purposes of this disclosure, is a store of electric power. In some embodiments, the electrical energy source includes a plurality of electrical energy source modules, wherein each of the electrical energy source modules comprise a plurality of batteries connected in series. Configuration of an energy source containing connected modules may be designed to meet an energy or power requirement and may be designed to fit within a designated footprint in an electric aircraft in which electric aircraft may be incorporated. As a non-limiting example, electrical energy source may include lithium-ion battery cells. Electrical energy source, and further embodiments of the electrical energy source, are discussed further with respect to FIG. 2 and FIG. 3.

Still referring to FIG. 1, electric aircraft 100 may include a laterally extending element 108, wherein the laterally extending element is attached to fuselage 104. As used in this disclosure a "laterally extending element" is an element that projects laterally from fuselage, including an outrigger, a spar, and/or a fixed wing that extends from fuselage. Laterally extending element 108 may project laterally from fuselage 104. In some embodiments, some portions of laterally extending element may have an airfoil shaped cross-section. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section may geometry includes an airfoil. An "airfoil"

as used in this disclosure is a shape designed such that a fluid flowing over it exerts differing levels of pressure against the top and bottom surface. This pressure differential creates lift when the fluid flowing over the lower surface creates a higher pressure than the fluid flowing over the upper surface. An airfoil may have a leading edge and a trailing edge. As used in this disclosure a "leading edge" is a foremost edge of an airfoil that first intersects with the fluid medium. The "trailing edge" is the back end of the airfoil and is the last point on the airfoil that the fluid medium comes in contact with. Airfoils may have a centerline, wherein the centerline is the locus of points halfway between the top and bottom surface of the airfoil. Thus, for a symmetrical airfoil, the centerline is a straight line from the leading edge to the trailing edge. Airfoils may also have a chord line, wherein the chord line is a straight line from the leading edge to the trailing edge. Accordingly, for a symmetric airfoil, the chord line and the centerline are identical. The position of an airfoil may be described using an angle of attack. An angle of attack is the angle between the chord line of the airfoil and the direction of the oncoming flow of the fluid. Many airfoils create lift at an angle of attack of zero; however, symmetric airfoils do not create lift at an angle of attack of zero. Symmetric airfoils create lift when the angle of attack is greater than zero and create downforce when the angle of attack is less than zero. In an embodiment, and without limitation, wing may include a leading edge. For example, and without limitation, leading edge may include one or more edges that may comprise one or more characteristics such as sweep, radius and/or stagnation point, droop, thermal effects, and the like thereof. In an embodiment, and without limitation, wing may include a trailing edge. In an embodiment, and without limitation, trailing edge may include an edge capable of controlling the direction of the departing external medium from the wing, such that a controlling force is exerted on the aircraft. Laterally extending element 108 may comprise differing and/or similar cross-sectional geometries over its cord length or the length from wing tip to where wing meets the aircraft's body. One or more wings may be symmetrical about the aircraft's longitudinal plane, which includes the longitudinal or roll axis reaching down the center of the aircraft through the nose and empennage, and the plane's yaw axis. Laterally extending element 108 may comprise controls surfaces configured to be commanded by a pilot or pilots to change a wing's geometry and therefore its interaction with a fluid medium, like air. Control surfaces may comprise flaps, ailerons, tabs, spoilers, slats, and the like.

Still referring to FIG. 1, in some embodiments, laterally extending element 108 may include a first laterally extending element 112 and a second laterally extending element 116. In some embodiments, laterally extending element 108 may be split into two parts by fuselage 104. In these cases, first laterally extending element 112 may be the portion of laterally extending element 108 that extends to the right side of electric aircraft 100 from fuselage 104. In these cases, second laterally extending element 116 may be the portion of laterally extending element 108 that extends to the left side of electric aircraft 100 from fuselage. In this instance, "right" and "left" are defined with reference to FIG. 1, and determined using the reference frame of a person sitting in the cockpit of electric aircraft 100 and facing towards the nose of electric aircraft 100. In some embodiments, first laterally extending element 112 and second laterally extending element 116 are separately connected to fuselage 104. For the purposes of this disclosure, "separately connected" means connected at connection points, wherein the connection points are each in a spatially different location. In some embodiments, first laterally extending element 112 and second laterally extending element 116 may each form an angle of sweep with fuselage 104. The angle of sweep is the angle between a hypothetical line extending perpendicularly from the fuselage, and the leading edge of laterally extending element 108. In some embodiments, the angle of sweep may be 0 degrees. In some embodiments, the angle of sweep may be 30 degrees. In some embodiments, the angle of sweep may be 30-45 degrees. In some embodiments, the angle of sweep may exceed 45 degrees. Generally speaking, an angle of sweep exceeding 45 degrees is used in aircraft designed to operate at high speeds, such as speeds exceeding mach 0.8, whereas an angle of sweep less than 45 degrees is used in aircraft designed to operate at speeds less than mach 0.8.

Still referring to FIG. 1, electric aircraft 100 includes a set of propulsors. Each propulsor of the set of propulsors is electrically connected to the electrical energy source and a generator. The set of propulsors includes at least a lift propulsor 120 and at least a pusher propulsor 124. As used in this disclosure a "propulsor" is a component and/or device used to propel a craft by exerting force on a fluid medium, which may include a gaseous medium such as air or a liquid medium such as water. In an embodiment, when a propulsor twists and pulls air behind it, it will, at the same time, push an aircraft forward with an equal amount of force. As a further non-limiting example, the propulsor may include a thrust element which may be integrated into the propulsor. The thrust element may include, without limitation, a device using moving or rotating foils, such as one or more rotors, an airscrew, or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like. The more air pulled behind an aircraft, the greater the force with which the aircraft is pushed forward. A propulsor may include a plurality of blades. As used in this disclosure a "blade" is a propeller that converts rotary motion from an engine or other energy source into a swirling slipstream. In an embodiment, blade may convert rotary motion to push the propeller forwards or backwards, with respect to the propulsor. In an embodiment the propulsors include a rotating power-driven hub, to which are attached several radial airfoil-section blades such that the whole assembly rotates about a longitudinal axis. The blades may be configured at an angle of attack. In an embodiment, and without limitation, angle of attack may include a fixed angle of attack. As used in this disclosure an "fixed angle of attack" is fixed angle between the chord line of the blade and the relative wind. As used in this disclosure a "fixed angle" is an angle that is secured and/or unmovable from the attachment point. For example, and without limitation fixed angle of attack may be 2.8° as a function of a pitch angle of 8.1° and a relative wind angle 5.4°. In another embodiment, and without limitation, angle of attack may include a variable angle of attack. As used in this disclosure a "variable angle of attack" is a variable and/or moveable angle between the chord line of the blade and the relative wind. As used in this disclosure a "variable angle" is an angle that is moveable from the attachment point. For example, and without limitation variable angle of attack may be a first angle of 4.7° as a function of a pitch angle of 7.1° and a relative wind angle 2.4°, wherein the angle adjusts and/or shifts to a second angle of 2.7° as a function of a pitch angle of 5.1° and a relative wind angle 2.4°. In an embodiment, angle of attack be configured to produce a fixed pitch angle. As used in this disclosure a "fixed pitch angle" is a fixed angle between a cord line of a blade and the rotational velocity direction. For example, and without limitation, fixed pitch angle may include 18°. In another embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine the speed of the forward movement as the blade rotates.

With continued reference to FIG. 1, the propulsors may include electric motors. The electric motor may be driven by direct current (DC) electric power and may include, without limitation, brushless DC electric motors, switched reluctance motors, induction motors, or any combination thereof. In some embodiments, the electric motors may be driven using alternating current (AC) electric power. A motor may also include electronic speed controllers or other components for regulating motor speed, rotation direction, and/or dynamic braking. The electric motors may be consistent with any electric motors disclosed in U.S. patent application Ser. No. 16/703,225, filed on Dec. 4, 2019, and titled "AN INTEGRATED ELECTRIC PROPULSION ASSEMBLY" or U.S. patent application Ser. No. 16/938,952, filed on Jul. 25, 2020, and titled "AN INTEGRATED ELECTRIC PROPULSION ASSEMBLY," the entirety of both are hereby incorporated by reference.

In an embodiment, and still referring to FIG. 1, lift propulsor 120 may be configured to provide lift to electric aircraft 100. As used in this disclosure a "lift" is a perpendicular force to the oncoming flow direction of fluid surrounding the surface. For example, and without limitation relative air speed may be horizontal to electric aircraft, wherein the lift force may be a force exerted in the vertical direction, directing electric aircraft upwards. In some embodiments, each of the at least a lift propulsor 120 may be connected to laterally extending element 108.

Still referring to FIG. 1, electric aircraft 100 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 1, a number of aerodynamic forces may act upon the electric aircraft during flight. Forces acting on electric aircraft 100 during flight may include, without limitation, thrust, the forward force produced by the rotating element of the electric aircraft and acts parallel to the longitudinal axis. Another force acting upon electric aircraft 100 may be, without limitation, drag, which may be defined as a rearward retarding force which is caused by disruption of airflow by any protruding surface of the electric aircraft 100 such as, without limitation, the wing, rotor, and fuselage. Drag may oppose thrust and acts rearward parallel to the relative wind. A further force acting upon electric aircraft 100 may include, without limitation, weight, which may include a combined load of the electric aircraft 100 itself, crew, baggage, and/or fuel. Weight may pull electric aircraft 100 downward due to the force of gravity. An additional force acting on electric aircraft 100 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 100 are designed to be as lightweight as possible. Reducing the weight of the aircraft and designing to reduce the number of components is essential to optimize the weight. To save energy, it may be useful to reduce weight of components of electric aircraft 100, including without limitation propulsors and/or propulsion assemblies.

Still referring to FIG. 1, the at least a propulsor of electric aircraft 100 may include at least a pusher propulsor 124. As used in this disclosure a "pusher propulsor" is a flight component that is mounted such that the component generates forward thrust through the medium. Pusher propulsor 124 may be configured to provide forward thrust to electric aircraft 100. As a non-limiting example, pusher propulsor 124 may include a pusher flight component such as a pusher propeller, a pusher motor, a pusher propulsor, and the like. Additionally, or alternatively, pusher propulsor 124 may include a plurality of pusher propulsors. Additionally, or alternatively pusher propulsor 124 may include multiple pusher propulsors 124. In some embodiments, the at least a pusher propulsor 124 may be attached to the back of fuselage 104. In FIG. 1, pusher propulsor 124 is attached to the back of fuselage 104.

Still referring to FIG. 1, in some embodiments, electric aircraft 100 may include a first propulsor boom 128. For the purposes of this disclosure, a "propulsor boom" is a support arm configured to support at least a propulsor. First propulsor boom 128 may be attached to 108. In some embodiments, first propulsor boom 128 may extend perpendicularly from laterally extending element 108. In some embodiments, a lift propulsor 120 from the at least a lift propulsor 120 may be connected to the first lift propulsor boom. First lift propulsor, as a non-limiting example, may be either of the lift propulsors 120 connected to first propulsor boom 128. In some embodiments, the at least a lift propulsor 120 may include a first pair of lift propulsors and a second pair of lift propulsors. In some embodiments, the first pair of lift propulsors may be connected to the first propulsor boom. As a non-limiting example, the pair of lift propulsor 120 attached to first propulsor boom 128 may be a first pair of lift propulsor 120.

Still referring to FIG. 1, in some embodiments, electric aircraft 100 may include a second propulsor boom 132. For the purposes of this disclosure, a "propulsor boom" is a support arm configured to support at least a propulsor. Second propulsor boom 132 may be attached to laterally extending element 108. In some embodiments, second propulsor boom 132 may extend perpendicularly from laterally extending element 108. In some embodiments, a lift propulsor 120 from the at least a lift propulsor 120 may be connected to second propulsor boom 132. Second lift propulsor, as a non-limiting example, may be either of the lift propulsors 120 connected to second propulsor boom 132. In some embodiments, the second pair of lift propulsors may be connected to the second propulsor boom 132. As a non-limiting example, the pair of lift propulsor 120 attached to second propulsor boom 132 may be a second pair of lift propulsor 120.

Figure 2:
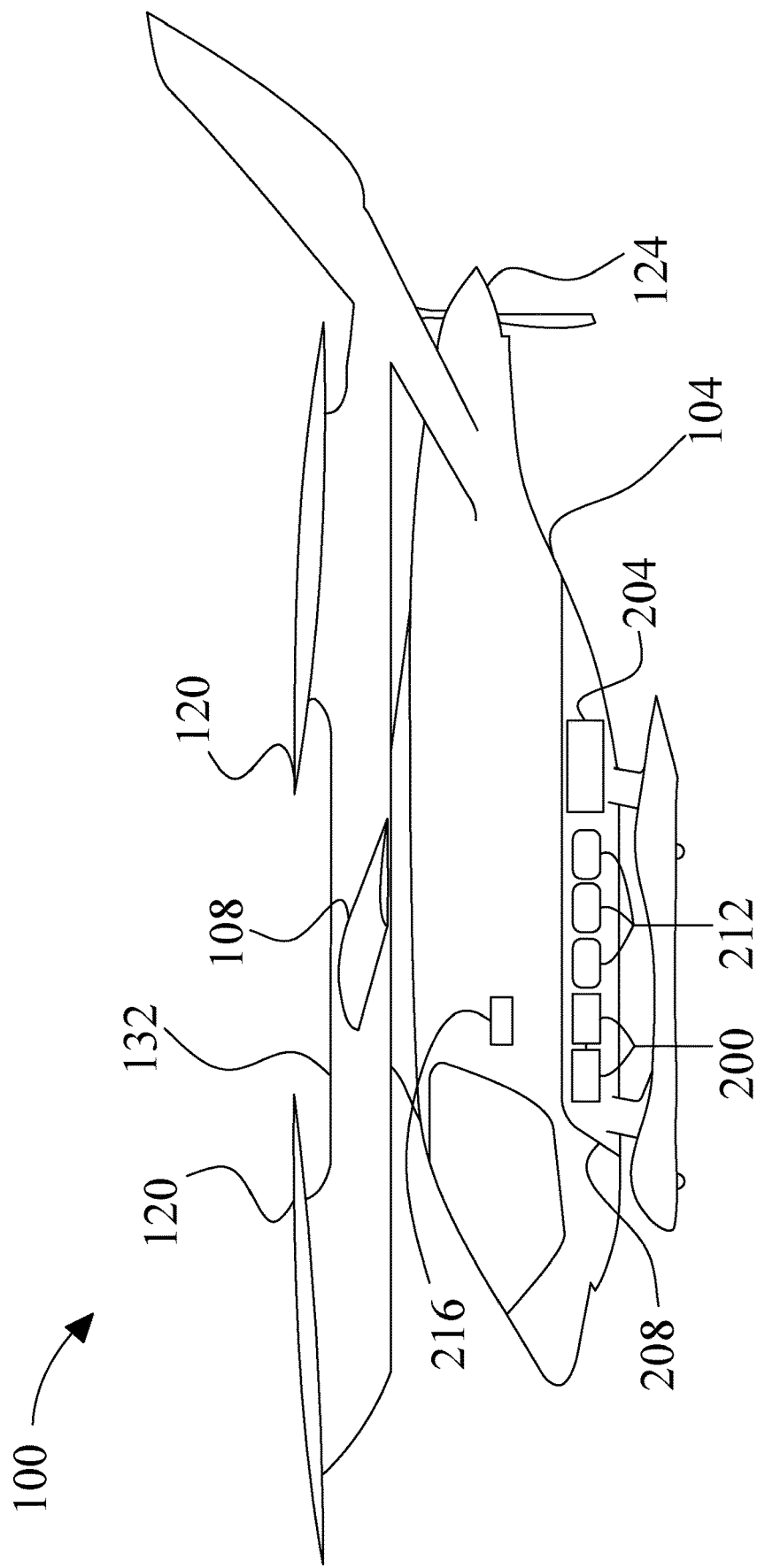
FIG. 2 is an illustration of an exemplary embodiment of a hybrid electric aircraft.

Referring now to FIG. 2, another exemplary embodiment of electric aircraft 100 is depicted. Electric aircraft 100 may include a laterally extending element 108. Electric aircraft 100 includes a set of propulsors. Each propulsor of the set of propulsors is electrically connected to a electrical energy source 200 and a generator 204, the set of propulsors Electric aircraft 100 may include at least a lift propulsor 120 and a pusher propulsor 124. Each of the at least a lift propulsor 120 shown in FIG. 2 may be connected to a second propulsor boom 132. It should be noted, for the sake of clarity, that electric aircraft 100 also may include another pair of lift propulsor 120 attached to a first propulsor boom 128, however, those elements are hidden in FIG. 2.

With continued reference to FIG. 2, fuselage 104 includes an electrical energy source 200. In some embodiments, electrical energy source may be located in a battery bay 208. For the purposes of this disclosure, a "battery bay" is a compartment configured to hold batteries in an aircraft. In some embodiments, battery bay 208 may be located in the belly of electric aircraft 100. For the purposes of this disclosure, the "belly" of electric aircraft 100 is the lower portion of fuselage 104 (i.e. the portion of fuselage 104 that is closest to the landing gear in FIG. 2). Electrical energy source 200 may be consistent with any electrical energy source disclosed as part of this disclosure. Electrical energy source 200 includes a plurality of batteries. In some embodiments, electrical energy source 200 may include a plurality of electrical energy source modules, wherein each of the electrical energy source modules include a plurality of batteries connected in series. Electrical energy source 200 may be used to provide a steady supply of electrical power to a load over the course of a flight by electric aircraft 100. For example, the electrical energy source 200 may be capable of providing sufficient power for "cruising" and other relatively low-energy phases of flight. An electrical energy source 200 may also be capable of providing electrical power for some higher-power phases of flight as well, particularly when the electrical energy source 200 is at a high SOC, as may be the case for instance during takeoff. In some embodiments, electrical energy source 200 may be capable of supplying power during vertical take off and landing. In some embodiments, electrical energy source 200 may not provide power when electric aircraft 100 is fixed-wing flight. In an embodiment, the electrical energy source 200 may be capable of providing sufficient electrical power for auxiliary loads including without limitation, lighting, navigation, communications, de-icing, steering or other systems requiring power or energy. As used herein the electrical energy source 200 may have high power density where the electrical power an electrical energy source 200 can usefully produce per unit of volume and/or mass is relatively high. The electrical power is defined as the rate of electrical energy per unit time. An electrical energy source 200 may include a device for which power that may be produced per unit of volume and/or mass has been optimized, at the expense of the maximal total specific energy density or power capacity, during design. Non-limiting examples of items that may be used as at least an electrical energy source 200 may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, electrical energy source 200 may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an electrical energy source 200.

Still referring to FIG. 2, connecting batteries in series may increase the voltage of at least an electrical energy source 200 which may provide more power on demand. Connecting batteries in parallel may increase total current capacity by decreasing total resistance, and it also may increase overall amp-hour capacity. The overall energy and power outputs of at least an electrical energy source 200 may be based on the individual battery cell performance or an extrapolation based on the measurement of at least an electrical parameter. Persons skilled in the art will be aware, after reviewing the entirety of this disclosure, of many different components of an electrical energy source 200. Exemplary electrical energy source 200s are disclosed in detail in U.S. patent application Ser. Nos. 16/948,157 and 16/948,140 both entitled "SYSTEM AND METHOD FOR HIGH ENERGY DENSITY BATTERY MODULE" by S. Donovan et al., which are incorporated in their entirety herein by reference.

Still referring to FIG. 2, fuselage 104 includes a generator 204. In some embodiments, generator 204 may be located in battery bay 208. An "generator," for the purposes of this disclosure, is a machine configured to generate electrical power from motive power. As a non-limiting example, in some embodiments, generator 204 may include a turbine generator. As a non-limiting example, in some embodiments, generator 204 may include a reciprocating engine. As a non-limiting example, in some embodiments, generator 204 may include a fuel cell engine. As a non-limiting example, in some embodiments, generator 204 may include a fuel reformer. In some embodiments, the generator 204 may have a power rating of over 200 kW. In some embodiments, the generator 204 may have a power rating of greater than 300 kW. In some embodiments, generator 204 may include a Rolls-Royce M250. A person of ordinary skill in the art would recognize, after having reviewed the entirety of this disclosure, that generator 204 may have a wide range of power ratings, depending on the power demands required by the specific application. Generator 204 is configured to produce enough electrical power to sustain the fixed-wing flight of electric aircraft 100. For the purposes of this disclosure, fixed-wing flight is "sustained" when electric aircraft 100 is able to maintain a consistent altitude when in fixed-wing flight. Generator 204 is not configured to produce enough electrical power to sustain vertical take-off and landing. Generator 204 generates electrical power using fuel from a fuel tank 212. Generator 204 is in fluid communication with fuel tank 212. For the purposes of this disclosure being in "fluid communication" means that fluid is able to flow from one of the fluidly connected elements to the other, notwithstanding any elements that temporarily or optionally restrict fluid flow, such as, as non-limiting examples, a check valve or a pressure disk. In some embodiments, fuselage 104 may include one or more inlet. inlet may provide an opening into the interior of fuselage 104 through which air may flow. In some embodiments, inlet may be designed to provide airflow to generator 204. As a non-limiting example this airflow may be used to cool generator 204. inlet may have a variety of profile shapes. As a non-limiting example, the profile shape inlet may be rectangular. In some embodiments, the profile shape of inlet may be tear drop shaped. For the purposes of this disclosure, the "profile shape" of inlet is the shape of the opening formed by inlet in fuselage 104 as projected onto a 2D surface. In some embodiments, inlet may be a low drag air inlet. As a non-limiting example, inlet may include a NACA duct. In some embodiments, fuselage 104 may include an outlet. Outlet may allow air to pass out of fuselage 104. Outlet may be in fluid connection with an exhaust of generator 204. In some embodiments, outlet may have a circular profile shape. In some embodiments, outlet may have a rectangular profile shape. In some embodiments, outlet may have an irregular shape. For the purposes of this disclosure, the "profile shape" of outlet is the shape of the opening formed by outlet in fuselage 104 as projected onto a 2D surface.

Still referring to FIG. 2, fuselage 104 includes fuel tank 212. In some embodiments, fuel tank 212 may be located in battery bay 208. For the purposes of this disclosure, a "fuel tank" is a container designed to hold fuel. Fuel tank 212 contains fuel. As a non-limiting example, fuel tank 212 may contain aviation fuel. As a non-limiting example, aviation fuel may include jet fuel such as Jet A-1 and Jet B. As a non-limiting example, aviation fuel may include unleaded kerosene or naphtha-kerosene. As a non-limiting example, aviation fuel may include gasoline suitable for the aviation context. In some embodiments, fuel tank 212 may contain gasoline. In some embodiments, fuel tank 212 may include diesel. In some embodiments, fuel tank 212 may contain hydrogen gas. A person of ordinary skill in the art, after having reviewed the entirety of this disclosure, would understand that the fuel contained in fuel tank 212 must be compatible with generator 204 in order to ensure operability. Fuel tank 212 is in fluid communication with generator 204. In some embodiments, fuel tank 212 may include a fuel line. The fuel line may be in fluid communication with generator 204. The fuel line may be a hose, tube, conduit, and the like. In some embodiments, fuel tank 212 may include a fuel pump. The fuel pump may be configured to pump fuel from fuel tank 212 to generator 204. In some embodiments, fuel tank 212 may include a fuel valve. A "valve," for the purposes of this disclosure, is a device for restricting or otherwise controlling the flow of a liquid, gas, or fluid. In some embodiments, fuel valve may control the flow of fuel between fuel tank 212 and generator 204. In some embodiments, fuel valve may include a gate valve. In some embodiments, fuel valve may include a solenoid-operated valve. In some embodiments, fuel valve may include a spray valve.

With continued reference to FIG. 2, in some embodiments, electric aircraft 100 may include a flight controller 216. Flight controller 216 may be communicatively connected to the generator 204. In some embodiments, flight controller 216 may be communicatively connected to each of the at least a propulsor. Flight controller 216 may be consistent with any flight controller disclosed as part of this disclosure. Flight controller 216 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. flight controller 216 may include a single computing device operating independently, or may include two or more computing device operating in concert, in parallel, sequentially or the like; two or more computing devices may be included together in a single computing device or in two or more computing devices. flight controller 216 may interface or communicate with one or more additional devices as described below in further detail via a network interface device. Network interface device may be utilized for connecting flight controller 216 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. flight controller 216 may include but is not limited to, for example, a computing device or cluster of computing devices in a first location and a second computing device or cluster of computing devices in a second location. flight controller 216 may include one or more computing devices dedicated to data storage, security, distribution of traffic for load balancing, and the like. flight controller 216 may distribute one or more computing tasks as described below across a plurality of computing devices of computing device, which may operate in parallel, in series, redundantly, or in any other manner used for distribution of tasks or memory between computing devices. flight controller 216 may be implemented using a "shared nothing" architecture in which data is cached at the worker, in an embodiment, this may enable scalability of system 100 and/or computing device.

With continued reference to FIG. 2, flight controller 216 may be designed and/or configured to perform any method, method step, or sequence of method steps in any embodiment described in this disclosure, in any order and with any degree of repetition. For instance, flight controller 216 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. flight controller 216 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 3:
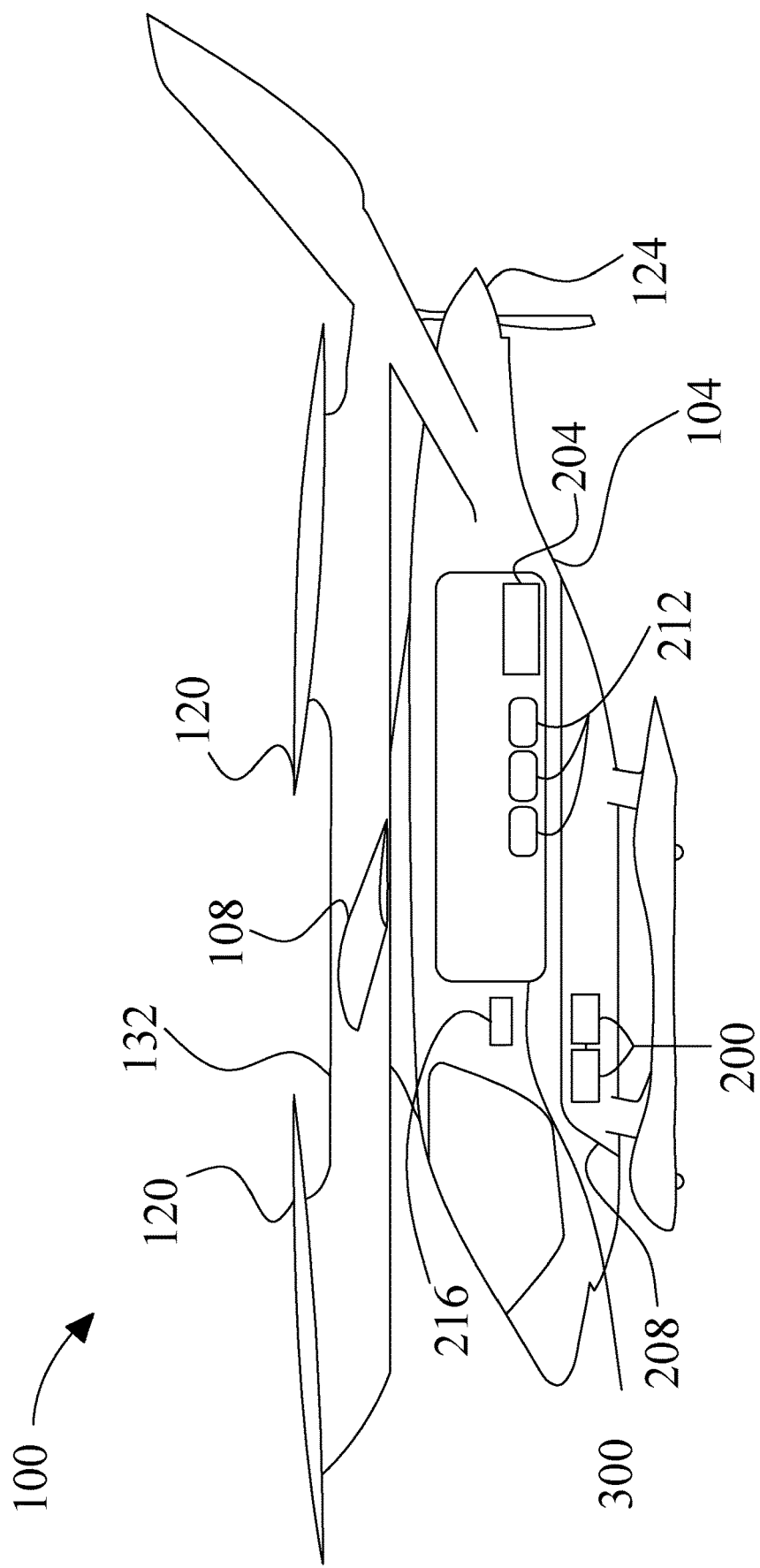
FIG. 3 is an illustration of another exemplary embodiment of a hybrid electric aircraft.

Referring now to FIG. 3, another exemplary embodiment of electric aircraft 100 is shown. In this embodiment, generator 204 may be located in a cargo hold 300. A "cargo hold," for the purposes of this disclosure, is a compartment in an aircraft, designed to store cargo, for example during a flight. In this embodiment, fuel tank 212 is located in cargo hold 300. In some embodiments, generator 204 may be located in cargo hold 300, while fuel tank 212 is located in battery bay 208. In some embodiments, fuel tank 212 may be located in cargo hold 300, whole generator 204 is located in battery bay 208. In some embodiments, where fuel tank 212 includes a plurality of fuel tanks, some of the fuel tanks may be located in battery bay 208 while some of the fuel tanks are located in cargo hold 300.

Figure 4:
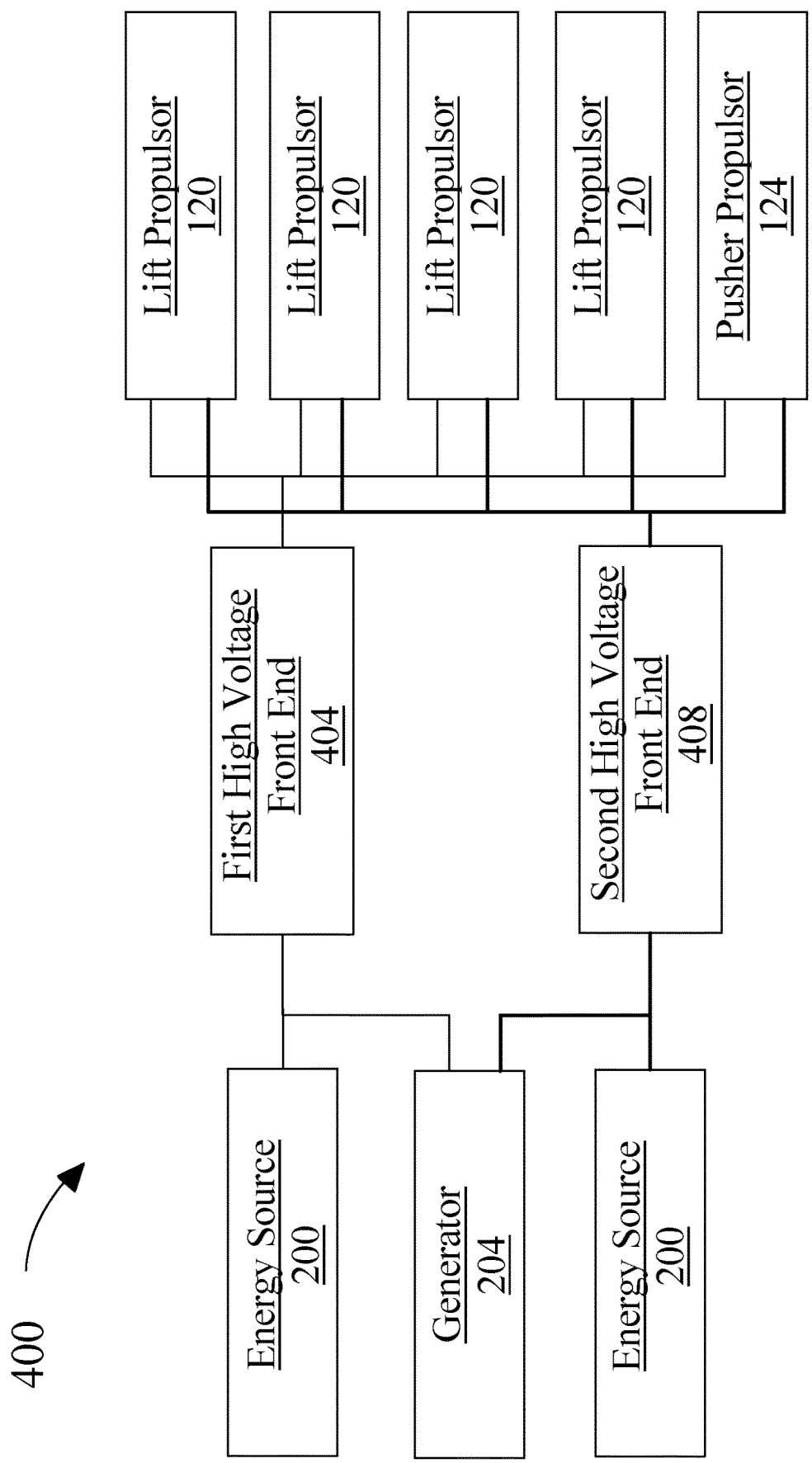
FIG. 4 is a block diagram of an exemplary power distribution system.

Referring now to FIG. 4, a power distribution system 400 is illustrated. Power distribution system 400 may be located on the electric aircraft, such as electric aircraft 200. In some embodiments, system 400 may include a first high voltage front end 404. For the purposes of this disclosure, a "high voltage front end" is an interface between one or more sources of energy and one or more loads, wherein the interface is configured to handle high voltage power. First high voltage front end 404 may be consistent with any high voltage front end device disclosed in U.S. patent application Ser. No. 17/108,798, filed on Dec. 1, 2020, and titled "SYSTEMS AND METHODS FOR A BATTERY MANAGEMENT SYSTEM INTEGRATED IN A BATTERY PACK CONFIGURED FOR USE IN ELECTRIC AIRCRAFT," the entirety of which is hereby incorporated by reference. First high voltage front end 404 may be electrically connected to electrical energy source 200. In some embodiments, first high voltage 404 may be electrically connected to an electrical energy source 200 of electrical energy source 200. In some embodiments, first high voltage front end 404 may be electrically connected to each of the at least a propulsor. In some embodiments, first high voltage front end 404 may provide power to each of the at least a propulsor. In some embodiments, first high voltage front end 404 may be electrically connected to generator 204. First high voltage front end 404 may receive power from the electrical energy sources 200 and generator 204 and send power to the lift propulsors 120 and pusher propulsor 124.

As depicted in FIG. 4, first high voltage front end 404 may be electrically connected to only a subset of electrical energy sources 200 and generator 204. As depicted in FIG. 4, first high voltage front end 404 may be electrically connected to one of two electrical energy source 200. First high voltage front end 404 may be electrically connected to generator 204. First high voltage front end 404 can distribute the power from these components to lift propulsors 212 and pusher propulsor 124.

With continued reference to FIG. 4, in some embodiments, system 400 may include a second high voltage front end 408. Second high voltage front end 408 may be consistent with any high voltage front end device disclosed in U.S. patent application Ser. No. 17/108,798, filed on Dec. 1, 2020, and titled "SYSTEMS AND METHODS FOR A BATTERY MANAGEMENT SYSTEM INTEGRATED IN A BATTERY PACK CONFIGURED FOR USE IN ELECTRIC AIRCRAFT." Second high voltage front end 408 may be electrically connected to electrical energy source 200. In some embodiments, second high voltage front end 408 may be electrically connected to each of the at least a propulsor. In some embodiments, second high voltage front end 408 may provide power to each of the at least a propulsor. In some embodiments, second high voltage front end 408 may be electrically connected to generator 204. Second high voltage front end 408 may receive power from the electrical energy sources 200 and generator 204 and send power to the lift propulsors 120 and pusher propulsor 124.

As depicted in FIG. 4, second high voltage front end 408 may be electrically connected to only a subset of electrical energy sources 200 and generator 204. As depicted in FIG. 4, second high voltage front end 408 may be electrically connected to one of two electrical energy sources 200 and not electrically connected to generator 204. Second high voltage front end 408 can distribute the power from these components to lift propulsors 120 and pusher propulsor 124.

With continued reference to FIG. 4, in some embodiments, first high voltage front end 404 and/or second high voltage front end 408 may be communicatively connected to a controller, such as a flight controller or battery management controller. As a non-limiting example, first high voltage front end 404 and/or second high voltage front end 408 may be communicatively connected to a controller using a Controller Area Network (CAN) bus. A "CAN bus," for the purposes of this disclosure is a specialized internal communications network for a vehicle, configured to allow a controller to communicate with other components in the vehicle without the need for a host computer.

Figure 5:
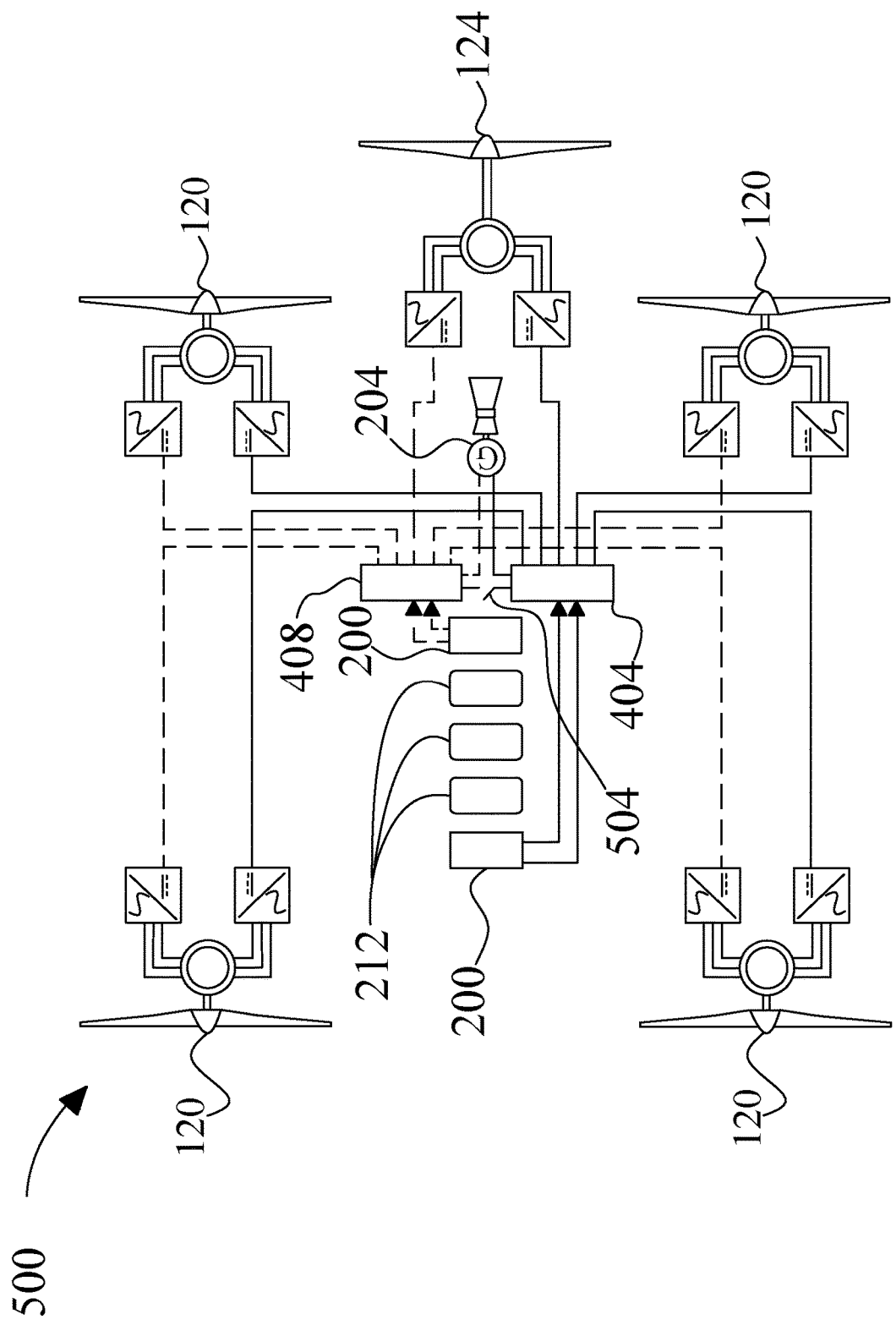
FIG. 5 is a diagram of an exemplary flight controller.

Referring now to FIG. 5, another power distribution system 500 is diagrammed in an exemplary embodiment. System 400 may be consistent with system 500. System 500 includes first high voltage front end 404 and second high voltage front end 408. In some embodiments, first high voltage front end and second high voltage front end may be connected by an interlock component 504. For the purposes of this disclosure, an "interlock component" is a component that ensures that one or more conditions are met before enabling or disabling an electric connection. Interlock component 504 may include any device configured to allow current flow in one state and disallow current flow in another state. As a non-limiting example, interlock component 504 may be a relay. A relay is an electrically and/or electromechanically operated switch that can receive control signals. A relay can be engaged or disengaged by the control signals. A relay need not have any moving parts and can be solid state. As another non-limiting example, interlock component 504 may be a mechanical switch. In its engaged state, interlock component 504 may electrically connect first high voltage front end 404 to second high voltage front end. In its disengaged state, in some embodiments, interlock component 504 does not electrically connect first high voltage front end 404 to second high voltage front end 408. In some embodiments, interlock component 504 may be electrically connected to a computing device, such as a flight controller. In some embodiments, the computing device may engage and/or disengage interlock component 504 by sending electrical signals to interlock component 504.

With continued reference to FIG. 5, the electrical connections going into/out of first high voltage front end 404 are indicated using solid lines. The electrical connections going into/out of second high voltage front end 408 are indicated using dashed lines. First high voltage front end 404 may receive electrical power from an energy source 200. In some embodiments, this may include multiple electrical connections to the energy source 200. First high voltage front end 404 may also receive electrical power from generator 204. Generator 204 may be in fluid communication with a plurality of fuel tanks 212. First high voltage front end 404 may supply electrical power to any of the at least a propulsor. In some embodiments, first high voltage front end 404 may be electrically connected to each lift propulsor 120. In some embodiments, first high voltage front end 404 may be electrically connected to a pusher propulsor 124.

With continued reference to FIG. 5, second high voltage front end 408 may receive electrical power from an energy source 200. In some embodiments, this may include multiple electrical connections to the energy source 200. Second high voltage front end 408 may also receive electrical power from generator 204. Second high voltage front end 408 may supply electrical power to any of the at least a propulsor. In some embodiments, second high voltage front end 408 may be electrically connected to each lift propulsor 120. In some embodiments, second high voltage front end 408 may be electrically connected to a pusher propulsor 124.

With continued reference to FIG. 5, in some embodiments, each of the propulsors (lift propulsors 120 and pusher propulsor 122) may be each electrically connected to a set of inverters, a first inverter and a second inverter. An "inverter," for the purposes of this disclosure, is a frequency converter that converts DC power into AC power. Specifically, first inverter and/or second inverter may supply AC power to drive the propulsors. First inverter and/or second inverter may be consistent with any inverter disclosed in in U.S. patent application Ser. No. 16/703,225, filed on Dec. 4, 2019, and titled "AN INTEGRATED ELECTRIC PROPULSION ASSEMBLY." First inverter and/or second inverter may be consistent with any inverter disclosed in disclosed in U.S. patent application Ser. No. 16/938,952, filed on Jul. 25, 2020, and titled "AN INTEGRATED ELECTRIC PROPULSION ASSEMBLY," the entirety of which is hereby incorporated by reference. In some embodiments, first high voltage front end 404 may be electrically connected to each of the first inverters which are electrically connected to each of the propulsors, but not electrically connected to each of the second inverters which are electrically connected to each of the propulsors. In these same embodiments, second high voltage front end 408 may be electrically connected to each of the second inverters which are electrically connected to each of the propulsors, but not electrically connected to each of the first inverters which are electrically connected to each of the propulsors.

Figure 6:
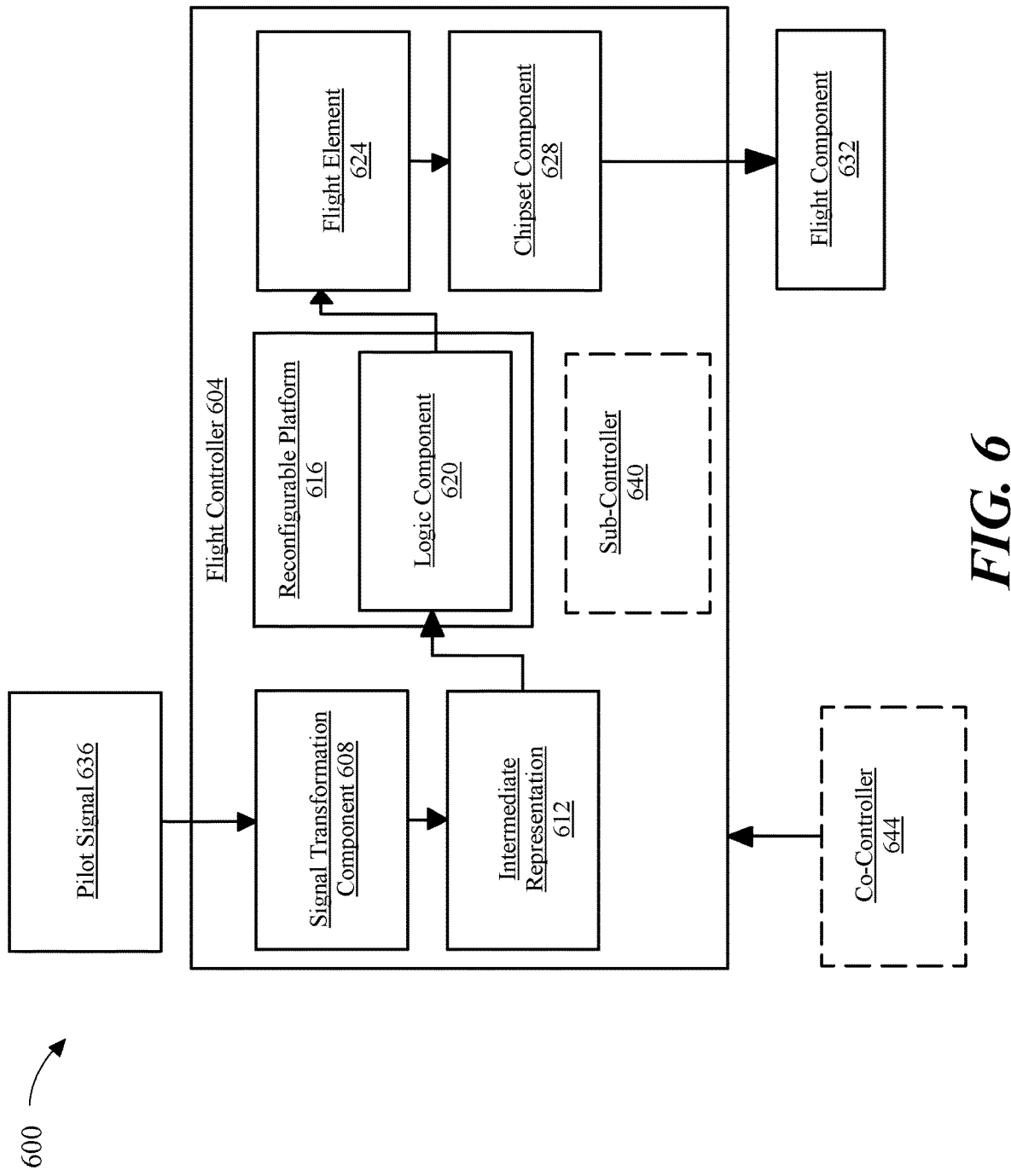
FIG. 6 is a diagram of an exemplary machine learning module.

Now referring to FIG. 6, an exemplary embodiment 600 of a flight controller 604 is illustrated. As used in this disclosure a "flight controller" is a computing device of a plurality of computing devices dedicated to data storage, security, distribution of traffic for load balancing, and flight instruction. Flight controller 604 may include and/or communicate with any computing device as described in this disclosure, including without limitation a microcontroller, microprocessor, digital signal processor (DSP) and/or system on a chip (SoC) as described in this disclosure. Further, flight controller 604 may include a single computing device operating independently, or may include two or more computing device operating in concert, in parallel, sequentially or the like; two or more computing devices may be included together in a single computing device or in two or more computing devices. In embodiments, flight controller 604 may be installed in an aircraft, may control the aircraft remotely, and/or may include an element installed in the aircraft and a remote element in communication therewith.

In an embodiment, and still referring to FIG. 6, flight controller 604 may include a signal transformation component 608. As used in this disclosure a "signal transformation component" is a component that transforms and/or converts a first signal to a second signal, wherein a signal may include one or more digital and/or analog signals. For example, and without limitation, signal transformation component 608 may be configured to perform one or more operations such as preprocessing, lexical analysis, parsing, semantic analysis, and the like thereof. In an embodiment, and without limitation, signal transformation component 608 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 608 may include transforming one or more low-level languages such as, but not limited to, machine languages and/or assembly languages. For example, and without limitation, signal transformation component 608 may include transforming a binary language signal to an assembly language signal. In an embodiment, and without limitation, signal transformation component 608 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 6, signal transformation component 608 may be configured to optimize an intermediate representation 612. As used in this disclosure an "intermediate representation" is a data structure and/or code that represents the input signal. Signal transformation component 608 may optimize intermediate representation as a function of a data-flow analysis, dependence analysis, alias analysis, pointer analysis, escape analysis, and the like thereof. In an embodiment, and without limitation, signal transformation component 608 may optimize intermediate representation 612 as a function of one or more inline expansions, dead code eliminations, constant propagation, loop transformations, and/or automatic parallelization functions. In another embodiment, signal transformation component 608 may optimize intermediate representation as a function of a machine dependent optimization such as a peephole optimization, wherein a peephole optimization may rewrite short sequences of code into more efficient sequences of code. Signal transformation component 608 may optimize intermediate representation to generate an output language, wherein an "output language," as used herein, is the native machine language of flight controller 604. For example, and without limitation, native machine language may include one or more binary and/or numerical languages.

In an embodiment, and without limitation, signal transformation component 608 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 6, flight controller 604 may include a reconfigurable hardware platform 616. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 616 may be reconfigured to enact any algorithm and/or algorithm selection process received from another computing device and/or created using machine-learning processes.

Still referring to FIG. 6, reconfigurable hardware platform 616 may include a logic component 620. As used in this disclosure a "logic component" is a component that executes instructions on output language. For example, and without limitation, logic component may perform basic arithmetic, logic, controlling, input/output operations, and the like thereof. Logic component 620 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 620 may be organized according to Von Neumann and/or Harvard architecture as a non-limiting example. Logic component 620 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 620 may include one or more integrated circuit microprocessors, which may contain one or more central processing units, central processors, and/or main processors, on a single metal-oxide-semiconductor chip. Logic component 620 may be configured to execute a sequence of stored instructions to be performed on the output language and/or intermediate representation 612. Logic component 620 may be configured to fetch and/or retrieve the instruction from a memory cache, wherein a "memory cache," as used in this disclosure, is a stored instruction set on flight controller 604. Logic component 620 may be configured to decode the instruction retrieved from the memory cache to opcodes and/or operands. Logic component 620 may be configured to execute the instruction on intermediate representation 612 and/or output language. For example, and without limitation, logic component 620 may be configured to execute an addition operation on intermediate representation 612 and/or output language.

In an embodiment, and without limitation, logic component 620 may be configured to calculate a flight element 624. As used in this disclosure a "flight element" is an element of datum denoting a relative status of aircraft. For example, and without limitation, flight element 624 may denote one or more torques, thrusts, airspeed velocities, forces, altitudes, groundspeed velocities, directions during flight, directions facing, forces, orientations, and the like thereof. For example, and without limitation, flight element 624 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 624 may denote that aircraft is following a flight path accurately and/or sufficiently.

Still referring to FIG. 6, flight controller 604 may include a chipset component 628. As used in this disclosure a "chipset component" is a component that manages data flow. In an embodiment, and without limitation, chipset component 628 may include a northbridge data flow path, wherein the northbridge dataflow path may manage data flow from logic component 620 to a high-speed device and/or component, such as a RAM, graphics controller, and the like thereof. In another embodiment, and without limitation, chipset component 628 may include a southbridge data flow path, wherein the southbridge dataflow path may manage data flow from logic component 620 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 628 may manage data flow between logic component 620, memory cache, and a flight component 632. As used in this disclosure a "flight component" is a portion of an aircraft that can be moved or adjusted to affect one or more flight elements. For example, flight component 632 may include a component used to affect the aircrafts' roll and pitch which may comprise one or more ailerons. As a further example, flight component 632 may include a rudder to control yaw of an aircraft. In an embodiment, chipset component 628 may be configured to communicate with a plurality of flight components as a function of flight element 624. For example, and without limitation, chipset component 628 may transmit to an aircraft rotor to reduce torque of a first lift propulsor and increase the forward thrust produced by a pusher component to perform a flight maneuver.

In an embodiment, and still referring to FIG. 6, flight controller 604 may be configured generate an autonomous function. As used in this disclosure an "autonomous function" is a mode and/or function of flight controller 604 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 624. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 604 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 604 will control the ailerons and/or rudders. As used in this disclosure "non-autonomous mode" is a mode that denotes a pilot will control aircraft and/or maneuvers of aircraft in its entirety.

In an embodiment, and still referring to FIG. 6, flight controller 604 may generate autonomous function as a function of an autonomous machine-learning model. As used in this disclosure an "autonomous machine-learning model" is a machine-learning model to produce an autonomous function output given flight element 624 and a pilot signal 636 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 636 may denote that a pilot is controlling and/or maneuvering ailerons, wherein the pilot is not in control of the rudders and/or propulsors. In an embodiment, pilot signal 636 may include an implicit signal and/or an explicit signal. For example, and without limitation, pilot signal 636 may include an explicit signal, wherein the pilot explicitly states there is a lack of control and/or desire for autonomous function. As a further non-limiting example, pilot signal 636 may include an explicit signal directing flight controller 604 to control and/or maintain a portion of aircraft, a portion of the flight plan, the entire aircraft, and/or the entire flight plan. As a further non-limiting example, pilot signal 636 may include an implicit signal, wherein flight controller 604 detects a lack of control such as by a malfunction, torque alteration, flight path deviation, and the like thereof. In an embodiment, and without limitation, pilot signal 636 may include one or more explicit signals to reduce torque, and/or one or more implicit signals that torque may be reduced due to reduction of airspeed velocity. In an embodiment, and without limitation, pilot signal 636 may include one or more local and/or global signals. For example, and without limitation, pilot signal 636 may include a local signal that is transmitted by a pilot and/or crew member. As a further non-limiting example, pilot signal 636 may include a global signal that is transmitted by air traffic control and/or one or more remote users that are in communication with the pilot of aircraft. In an embodiment, pilot signal 636 may be received as a function of a tri-state bus and/or multiplexor that denotes an explicit pilot signal should be transmitted prior to any implicit or global pilot signal.

Still referring to FIG. 6, autonomous machine-learning model may include one or more autonomous machine-learning processes such as supervised, unsupervised, or reinforcement machine-learning processes that flight controller 604 and/or a remote device may or may not use in the generation of autonomous function. As used in this disclosure "remote device" is an external device to flight controller 604. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 6, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 604 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 6, flight controller 604 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 604. Remote device and/or FPGA may transmit a signal, bit, datum, or parameter to flight controller 604 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 604 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 6, flight controller 604 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 6, flight controller 604 may include, but is not limited to, for example, a cluster of flight controllers in a first location and a second flight controller or cluster of flight controllers in a second location. Flight controller 604 may include one or more flight controllers dedicated to data storage, security, distribution of traffic for load balancing, and the like. Flight controller 604 may be configured to distribute one or more computing tasks as described below across a plurality of flight controllers, which may operate in parallel, in series, redundantly, or in any other manner used for distribution of tasks or memory between computing devices. For example, and without limitation, flight controller 604 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 6, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 632. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 6, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 604. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 612 and/or output language from logic component 620, wherein output language may include one or more analog-to-digital conversions, low bit rate transmissions, message encryptions, digital signals, binary signals, logic signals, analog signals, and the like thereof described above in detail.

Still referring to FIG. 6, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 6, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 6, flight controller 604 may also be implemented using a "shared nothing" architecture in which data is cached at the worker, in an embodiment, this may enable scalability of aircraft and/or computing device. Flight controller 604 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 6, flight controller may include a sub-controller 640. As used in this disclosure a "sub-controller" is a controller and/or component that is part of a distributed controller as described above; for instance, flight controller 604 may be and/or include a distributed flight controller made up of one or more sub-controllers. For example, and without limitation, sub-controller 640 may include any controllers and/or components thereof that are similar to distributed flight controller and/or flight controller as described above. Sub-controller 640 may include any component of any flight controller as described above. Sub-controller 640 may be implemented in any manner suitable for implementation of a flight controller as described above. As a further non-limiting example, sub-controller 640 may include one or more processors, logic components and/or computing devices capable of receiving, processing, and/or transmitting data across the distributed flight controller as described above. As a further non-limiting example, sub-controller 640 may include a controller that receives a signal from a first flight controller and/or first distributed flight controller component and transmits the signal to a plurality of additional sub-controllers and/or flight components.

Still referring to FIG. 6, flight controller may include a co-controller 644. As used in this disclosure a "co-controller" is a controller and/or component that joins flight controller 604 as components and/or nodes of a distributer flight controller as described above. For example, and without limitation, co-controller 644 may include one or more controllers and/or components that are similar to flight controller 604. As a further non-limiting example, co-controller 644 may include any controller and/or component that joins flight controller 604 to distributer flight controller. As a further non-limiting example, co-controller 644 may include one or more processors, logic components and/or computing devices capable of receiving, processing, and/or transmitting data to and/or from flight controller 604 to distributed flight control system. Co-controller 644 may include any component of any flight controller as described above. Co-controller 644 may be implemented in any manner suitable for implementation of a flight controller as described above.

In an embodiment, and with continued reference to FIG. 6, flight controller 604 may be designed and/or configured to perform any method, method step, or sequence of method steps in any embodiment described in this disclosure, in any order and with any degree of repetition. For instance, flight controller 604 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 7:
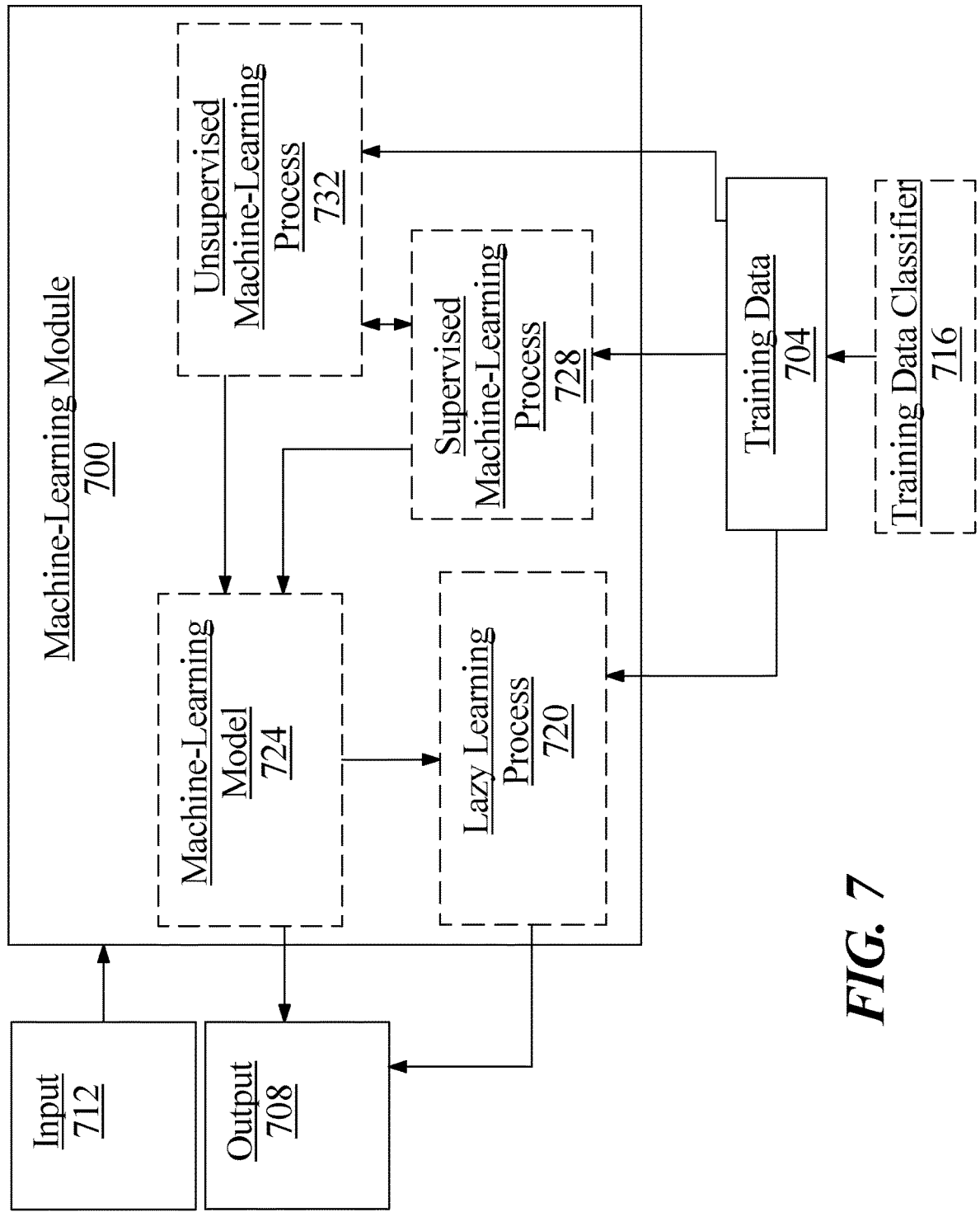
FIG. 7 is a block diagram of a computing system that can be used to implement any one or more of the methodologies disclosed herein and any one or more portions thereof.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example flight elements and/or pilot signals may be inputs, wherein an output may be an autonomous function.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
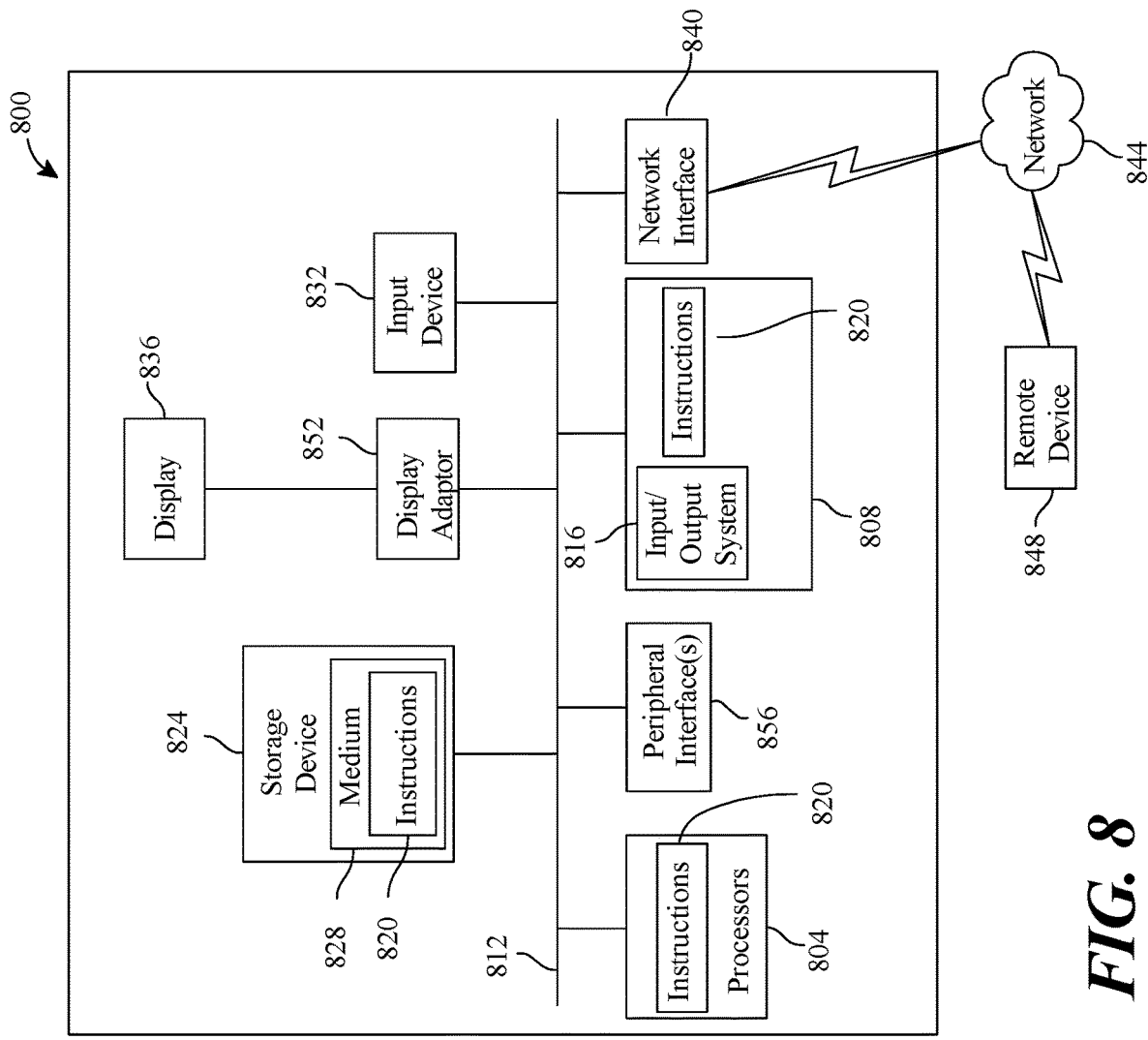
FIG. 8 shows a diagrammatic representation of one embodiment of a computing device in the exemplary form of a computer system.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An integral hybrid electric aircraft system, the system comprising:
   a fuselage, the fuselage comprising:
      an electrical energy source, wherein the electrical energy source comprises a plurality of batteries;
      a fuel tank, wherein the fuel tank contains fuel; and
      a generator, wherein:
         the generator is in fluid communication with the fuel tank;
         the generator generates electricity using the fuel from the fuel tank; and
   a set of propulsors, wherein each propulsor of the set of propulsors is electrically connected to the electrical energy source and the generator, wherein the set of propulsors is powered by the generator during fixed-wing flight, the set of propulsors comprising:
   at least a pusher propulsor, wherein the at least pusher propulsor is configured to provide forward thrust; and
   at least a lift propulsor, wherein:
      the at least lift propulsor is configured to provide lift;
a power distribution arrangement, comprising:
   a first voltage interface, wherein the first voltage interface:
      receives power from a first battery of the electrical energy source and the generator; and
      provides power to the at least lift propulsor and the at least pusher propulsor via at least a first inverter of a set of inverters;
   a second voltage interface, wherein the second voltage interface:
      receives power from a second battery of the electrical energy source and the generator; and
      provides power to the at least lift propulsor and the at least pusher propulsor via at least a second inverter of the set of inverters; and
   an interlock component configured to selectively electrically connect the first voltage interface and the second voltage interface, wherein:
      the interlock component has an engaged state in which the first voltage interface and the second voltage interface are electrically connected; and
      the interlock component has a disengaged state in which the first voltage interface and the second voltage interface are electrically isolated; and
a flight controller configured to engage and disengage the interlock component and control power distribution from the electrical energy source and the generator to the set of propulsors.

2. The system of claim 1, wherein the electrical energy source comprises a plurality of electrical energy source modules, wherein each of the electrical energy source modules comprises a plurality of batteries connected in series.

3. The system of claim 1, further comprising a laterally extending element, wherein:
   the laterally extending element is attached to the fuselage;
   the laterally extending element extends laterally from the fuselage; and
   each of the at least lift propulsor is connected to the laterally extending element.

4. The system of claim 1, wherein the set of propulsors is powered by the electrical energy source during vertical take-off and landing.

5. The system of claim 1, wherein the flight controller is communicatively connected to the generator.

6. The system of claim 1, further comprising a laterally extending element, wherein:
   the laterally extending element is attached to the fuselage;
   the laterally extending element extends laterally from the fuselage; and
   the laterally extending element has an airfoil cross section.

7. The system of claim 1, wherein the fuel tank further comprises a fuel pump, wherein the fuel pump is configured to pump fuel from the fuel tank to the generator.

8. The system of claim 1, wherein the fuel tank is located in a battery bay.

9. The system of claim 1, wherein the fuel tank is located in a cargo hold.

10. The system of claim 1, further comprising a laterally extending element, wherein:
   the laterally extending element extends laterally from the fuselage; and
   the laterally extending element comprises a first laterally extending element and a second laterally extending element, wherein:
      the first laterally extending element and the second laterally extending element are separately connected to the fuselage; and
      the first laterally extending element and the second laterally extending element each form an angle of sweep with the fuselage, wherein the angle of sweep is the angle between a line perpendicular to the fuselage, and the laterally extending element.

11. The system of claim 1, wherein the generator is located in a cargo hold.

12. The system of claim 1, wherein the generator is located in a battery bay.

13. The system of claim 1, wherein the generator has a power output of greater than 200 kW.

14. The system of claim 13, wherein the generator has a power output of greater than 300 kW.

15. The system of claim 6, further comprising a first propulsor boom and a second propulsor boom, wherein the first propulsor boom and the second propulsor boom are attached to the laterally extending element.

16. The system of claim 15, wherein:
   a lift propulsor from the at least lift propulsor is connected to the first propulsor boom; and
   a lift propulsor from the at least lift propulsor is connected to the second propulsor boom.

17. The system of claim 16, wherein:
   the at least lift propulsor comprises a first pair of lift propulsors and a second pair of lift propulsors;
   the first pair of lift propulsors is connected to the first propulsor boom; and
   the second pair of lift propulsors is connected to the second propulsor boom.

18. The system of claim 1, wherein the generator comprises a turbine generator.

* * * * *